INVENTOR.
ROGER L. RIPERT

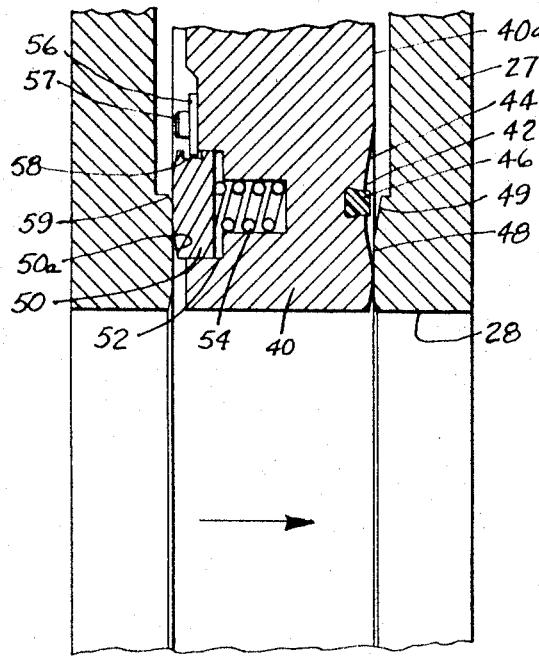
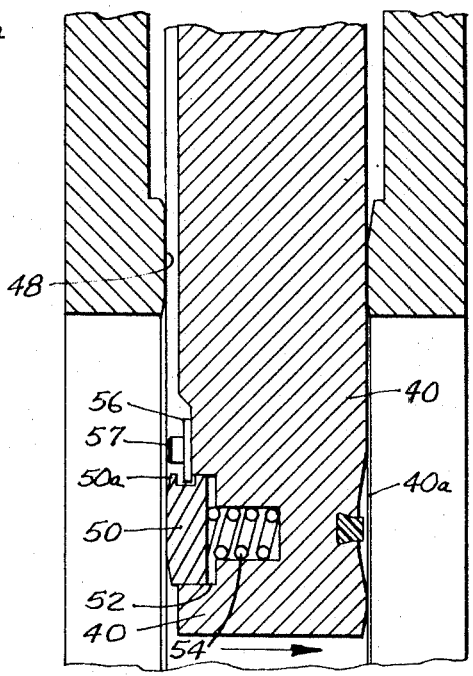

Aug. 26, 1969  R. L. RIPERT  3,463,447
VALVE STRUCTURE WITH PROTECTED RESILIENT SEALS
Filed May 27, 1968  4 Sheets-Sheet 3
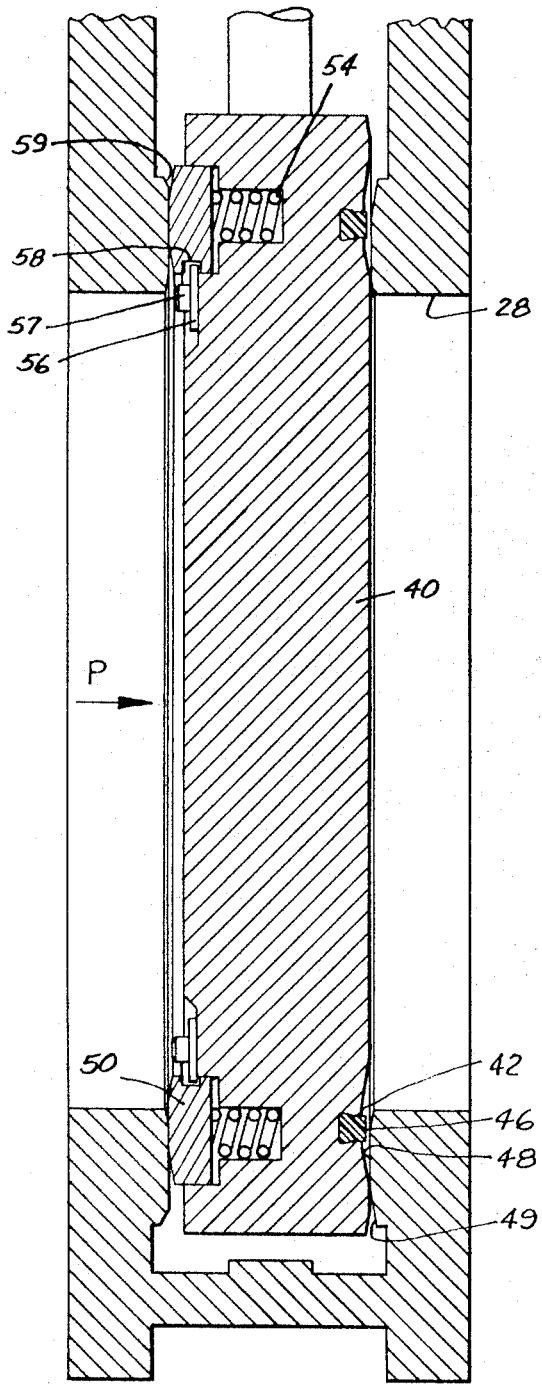
FIG-5-
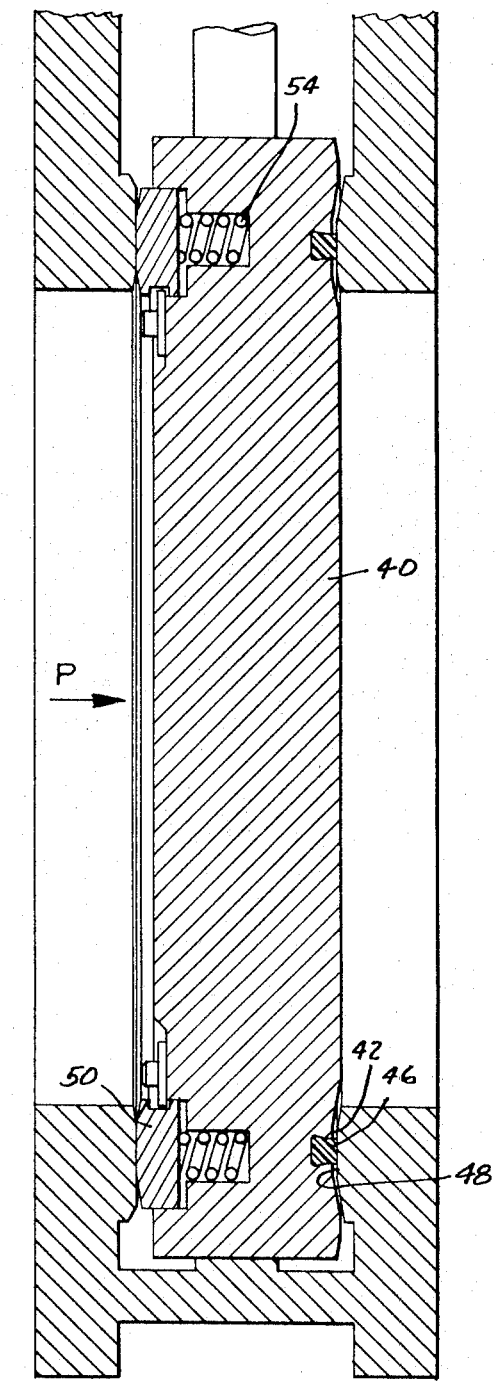
FIG-6-
INVENTOR.
ROGER L. RIPERT
BY
Gregg & Stidham
ATTORNEYS

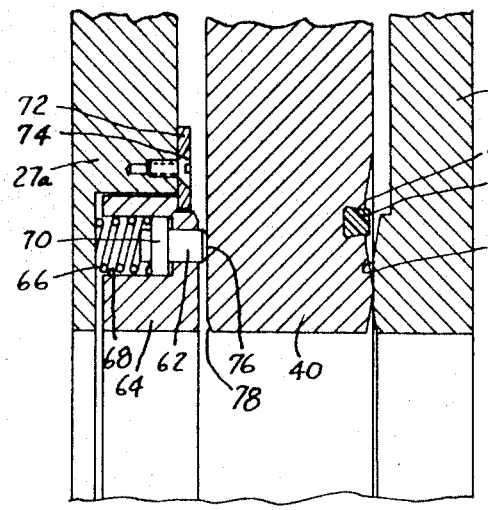
FIG-7-
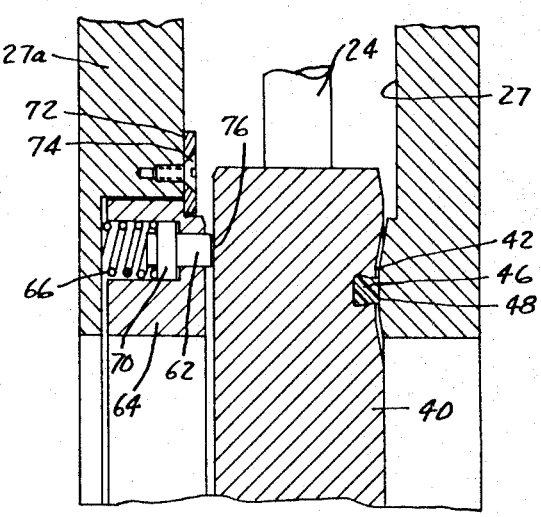
FIG-8-
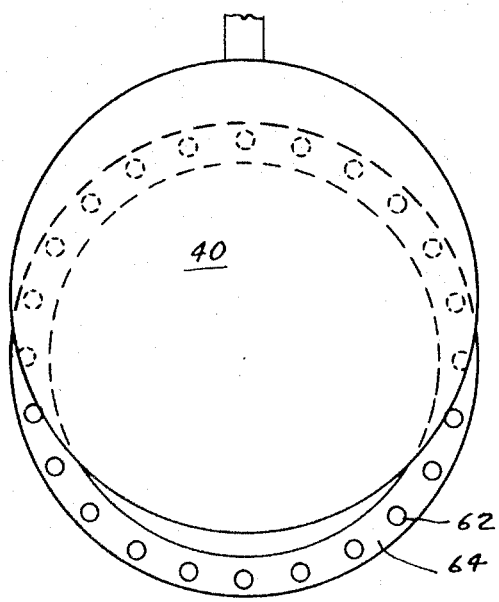
FIG-10-
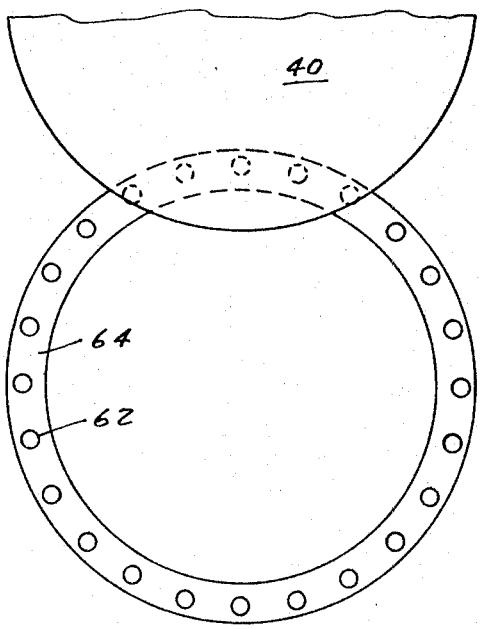
FIG-9-
INVENTOR.
ROGER L. RIPERT
BY
ATTORNEYS United States Patent Office 3,463,447
Patented Aug. 26, 1969

3,463,447
VALVE STRUCTURE WITH PROTECTED RESILIENT SEALS
Roger L. Ripert, Concord, Calif., assignor to Grove Valve and Regulator Company, Oakland, Calif., a corporation of California
Filed May 27, 1968, Ser. No. 732,345
Int. Cl. F16k 25/02, 3/16
U.S. Cl. 251—158                                    9 Claims

ABSTRACT OF THE DISCLOSURE

In a valve with a resilient main seal ring for sealing between opposing working surfaces on the valve closure member and on the body, a device for protecting the resilient seal ring comprising an annular recess in one working surface and a complementary protruding surface on the other working surface. The resilient seal is carried within the recess and is situated below the level of the adjacent surface so as to be free of sliding contact with the opposing surface until the recess and the protruding surface are moved relative to each other to be brought into alignment. The working surfaces have complementary wedging surfaces so that the closure member is cammed back as the valve is opened. In the case of a gate valve, one or more biased members on the upstream side of the gate augment fluid pressure in forcing the gate downstream when it is closed, in order to engage the seal.

---

This invention relates to a valve structure with a protected resilient seal and, more particularly, to a gate valve with a resilient seal carried in a recess and disposed below the surface of the member in which it is carried so as to be free from sliding contact with opposing valve surfaces.

In many valve structures, resilient seals are preferred as the main sealing medium because such seals can provide a good, fluid-tight seal despite surface irregularities or imperfections in the opposing valve working member. In many valve types, such as gate valves, ball valves, plug valves and the like, the valve closure member is caused to slide across the opposing working surfaces on the body as the valve is opened and closed, subjecting the resilient seals to abrading sliding engagement. In most instances this causes no particular problems because the seal rings may be lubricated, or are formed of materials which are resistant to abrasion, and maintain a good fluid-tight seal even after many cycles of operation. However, there are some instances in which it is desirable to avoid any sliding engagement of the resilient seal because the seals are necessarily particularly susceptible to damage by abrasion and scraping. For example, when the valve is used in a vacuum system, a lubricant cannot be applied to the seal ring because it would contaminate the system. Also, when the valve is adapted for cryogenic use of the extreme cold temperatures require the use of specially selected materials for the seal rings, which materials are not abrasion resistant. In addition, under such conditions, many materials become harder and are more likely to be scratched. Obviously, it is highly desirable to avoid abrading or scraping the resilient ring in order to preserve the integrity of the seal. It, therefore, follows that it is highly desirable to operate the valve with a minimum amount of sliding movement across the resilient seal.

It is, therefore, an object of this invention to protect a resilient seal ring against sliding engagement between the valve closure member and the valve body during operation of the valve.

It is a further object of this invention to provide a gate valve having a resilient seal carried in a recess and disposed below the adjacent valve working surfaces.

It is a further object of this invention to provide a valve having an annular recessed working surface which, in closed position, opposes a complementary protruding working surface on the body which enters into the recess to seal against a resilient seal carried therein.

It is a further object of this invention to provide a gate valve with opposed annular working surfaces on the gate and the body, one being recessed and the other protruding, together with means for biasing the gate axially for entry of the protruding surface.

In carrying out this invention, I provide a valve with opposing annular sealing positions or working surfaces on the valve closure member and on the body. One working surface is formed by the bottom of an annular recess having walls which taper from the bottom surface outward to the adjacent valve surfaces. A resilient seal is carried within a further recess at the bottom of the recessed working surface, with the outer surface of the seal displaced below the level of the outer surfaces adjacent the recess. The opposing complementary working surface is formed as an annular protuberance which extends beyond adjacent surfaces so as to enter into the recessed working surface when the valve is closed, but it simply slides along the outer surface of the opposing member during operation thereof. In a gate valve, the recess and resilient seal are preferably on the downstream side of the gate so that high fluid pressure will move the gate downstream to insure sealing engagement. In addition, biasing means are provided to act against the upstream side of the gate and the opposing body surfaces to push the gate downstream, even at low pressures.

Other objects and advantages of this invention will become apparent when the description following is read in conjunction with the accompanying drawings wherein:

FIGS. 2 and 3 are partial section views illustrating movement of the gate as it commences to close;

FIG. 4 is a more or less schematic illustration showing the relationships of the opposing working surfaces as the valve is moved toward closed position;

FIGS. 5 and 6 are partial section views showing continued downward movement of the gate to fully closed position.

FIGS. 7 and 8 are partial section views showing another embodiment of this invention; and FIGS. 9 and 10 are more or less schematic views illustrating the operation of this embodiment.

Figure 1:
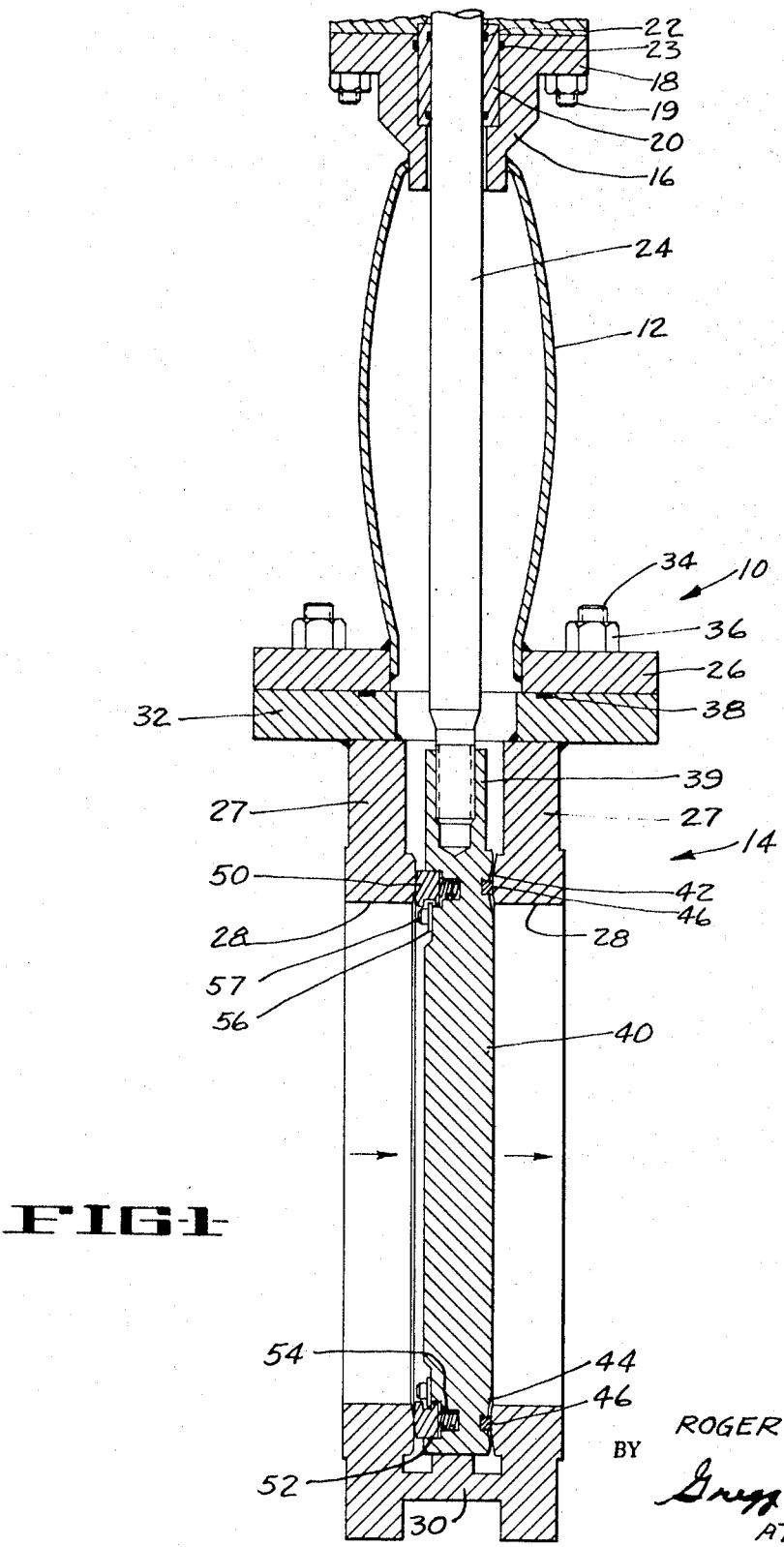
FIG. 1 is a vertical section view taken through a gate valve embodying features of this invention.

Referring now to the drawings with greater particularity, there is illustrated in FIG. 1 a gate valve construction 10 comprising an upper body portion or bonnet 12 secured to a relatively thick or lower body portion 14. The upper body portion may, if desired be formed of relatively thin walls which are expanded outward as shown. A valve stem slide bearing assembly 16 is welded or otherwise secured at the top of the bonnet member 12, and includes a flange member 18 to which valve operating means (not shown) may be secured, as by means of studs 19. A slide bushing 20 is accommodated within the stem bearing member, and is provided with suitable seal means such as O-rings 22, 23 to provide a seal between the stem 24 and the slide bearing 16. The thin upper body portion 12 is welded within an opening in a connecting flange 26.

The lower body portion is, in its preferred form, formed of relatively thick metal end plates 27, each including a fluid passage opening 28. A body band 30 is secured between the end plates by any suitable means such as welding. A flange 32 welded to the upper end of the lower body portion 14 carries a plurality of studs 34 which extend through accommodating openings in the upper flange so that the flanges are firmly secured together by tightening nuts 36, with suitable sealing means 38 between the flanges. The valve stem 24 is threaded or otherwise secured to an upstanding female coupling portion 39 of a valve gate 40 which, apart from the coupling 40 and lateral guides (not shown) may be of generally circular configuration.

When the gate is in its closed position shown in FIG. 1, opposing working surfaces on the gate 40 and the body walls 27 seal off the flow passages. This is preferably accomplished by means of a resilient seal 46 which may be carried on either the gate or the body as desired. In the embodiment illustrated, the seal 46 is carried on the gate, and to protect it against abrasion during movement of the gate it is carried within an annular recess 42 having inner and outer chamfered walls 44, which is cut into the downstream side of the gate 40. The resilient seal 46 itself may be carried in a narrower groove or recess which is cut further into the gate at the bottom of the working surface recess 42. The resilient seal may, if desired, be bonded or molded into the recess for positive retention.

As can be seen more clearly in FIGS. 2 and 3, the outer surface of the resilient seal 46 is disposed at a level below the outer surface 40a of the gate 40 for a purpose hereinafter to be described. In the embodiment shown, the seal is on the downstream side of the gate, and opposing it is a complementary, annular proturberance 48 with inner and outer chamfered surfaces 49. The protruding surface is formed so that in the closed position shown in FIG. 1 it extends into the recess 42 to engage the resilient seal 46.

On the upstream side of the gate, there is provided a pusher member 50 which may take the form of a ring carried within an accommodating recess 52 on the gate and is biased outward as by means of a plurality of coiled springs 54. A series of washers 56 or the like which are secured to the gate 40, as by means of cap screws 57, engage in a peripheral groove 58 in the pusher ring to act as stop means for limiting outward movement thereof. Again as shown more clearly in FIGS. 2 and 3, the outer surface of the pusher member is chamfered at the radially inner and outer portions thereof 50a and the limit stop washers are so positioned as to insure engagement of the pusher member 50 with the upstream cham fered body surfaces 59 so that the pusher ring will pass by and be cammed inward against the force of springs 54 during assembly of the valve. The coiled springs are of such strength and number that they supply sufficient force against the upstream valve body surface 48 to force the gate 40 downstream and insure penetration of the protruding body working surface 48 into the gate recess 42 to engage the resilient seal 46 and provide a fluid-tight seal even under extremely low pressure conditions. In conditions of high pressure, the fluid acts against the face of the gate 40 to augment the force of the springs, driving it downstream to insure the seal.

Referring now to FIGS. 2, 3 and 4, the valve gate is shown in its initial stages of movement from open position to closed position. As the valve commences its downward movement from the position of FIG. 2, the outer surface 40a of the gate will slide against the working surface 48 on the body and because the resilient seal is displaced below the gate surface 40a, it will be free of engagement with the body surfaces. The lower portion of the recess 42 and the upper portion of the protruding surface 48 on the body are of complementary crosssection and move opposite each other in the initial stages of gate movement. However, since they curve in opposite directions, the protruding surface will simply bridge the small portion of the recess it intersects and cannot enter into the recess to engage the resilient seal. This is shown schematically in FIG. 4 wherein the downwardly directed arcuate portion represents the protruding surface 48 and the upwardly directed arcuate portions 42 represent the recess in two positions of operation representing the position wherein the bottom of the recess is opposite the top of the protruding portion and a second position approximating that shown in FIG. 3.

In FIG. 5 it will be seen that the gate 40 has moved to a position where it is almost fully closed and the protruding body surface has still not entered into the complementary recess 42. At this point, the chamfered surface on the body and recess come into engagement and as the gate is closed further the pusher ring 50 under force of the coiled springs 54 forces the gate downstream to insure penetration of the protruding surface 48.

Finally, when the gate reaches the position of FIG. 6 the protruding and recessed working surfaces are in complete alignment and the protruding surfaces 48 is in sealing engagement with the resilient seal 46 under pressure of the coil springs 54, augmented by any fluid pressure on the upstream side of the valve moving in the direction of the arrow P.

Subsequently, when the valve is moved to open position, the chamfered edges on the recess and on the body 44, 49 slide against each other during initial movement of the gate 40, and these surfaces cam against each other to force the gate valve back upstream until the valve gate outer surface 40a once again rides on the valve body working surface 48 in the position shown in FIG. 5. Thereafter, throughout movement of the gate to fully open position, the opposing working surfaces pass through the relationships illustrated in FIG. 4 with the resilient seal 46 free of engagement with the body working surface. The seal remains free of such engagement until the gate is once again moved to the fully closed position illustrated in FIG. 6.

Referring now to FIGS. 7 to 10, there is shown another embodiment of my invention wherein the pusher ring 50 of FIGS. 1 to 6 is replaced by a series of pusher ring 50 of FIGS. 1 to 6 is replaced by a series of pusher buttons 62 which may be mounted on either the body or the gate to bias the gate downstream. In FIG. 7 the buttons 62 are shown carried around the circumference of a mounting ring 64 secured on the body and biased outward against the gate 40 under the force of coil springs 66 carried within bores 68 in the mounting ring and pressing against radial collars 70 on the buttons 62. The mounting ring is held in place on the upstream body wall 27a as by means of a series of washers or the like 72 held in place by screws 74.

The buttons are chamfered at 76 around their edges to engage with a complementary chamfer 78 around the valve gate 40 so that as the gate moves into contact with each button it can slide by it, and cam the button inward, whereby the gate is biased downstream by them. As shown schematically in FIGS. 9 and 10, the buttons 62 are depressed progressively around the circumference of the mounting ring 64 in both directions from the upper portion thereof as the gate slides past them. Hence, the gate 40 is biased downstream at just those levels which are actually opposing the protruding working surface 48 on the downstream body wall, providing a more uniform action and avoiding the natural tilting of the pusher ring 50 when it is depressed on just one side of the horizontal center line. At the same time, operation of the gate is made easier by reason of the fact that fewer than all of the coil springs are biased against the gate until it reaches its closed position.

While this invention has been described in conjunction with preferred embodiments thereof, it is obvious that modifications and changes therein may be made by those skilled in the art without departing from the spirit and scope of this invention as defined by the claims appended hereto.

What is claimed as invention is:

1. In a valve device comprising:
   a valve body member having fluid openings therein,
   an annular body sealing portion on said valve body surrounding one of said fluid openings, a valve closure member mounted for movement across said annular sealing portion between closed and open positions, an annular valve sealing portion on said closure member, said sealing portions being in alignment when said closure member is in its closed position, the improvement including:

means forming an annular recess in one of said sealing portions, an annular protuberance on the other sealing portion adapted to be received within the recess in the opposing sealing portion when in alignment, and a resilient seal ring is carried on said recess with the outer surface thereof below the level of surfaces adjacent to said recess, said closure member sealing portion being conditioned for limited axial movement to bring said annular protuberance into engagement with said resilient seal.

2. The combination defined by claim 1 wherein:

said fluid openings form upstream and downstream flow passages, and said sealing portions are on the downstream side of said closure member and said closure member is movable under upstream fluid pressure when in said closed position.

3. The combination defined by claim 1 wherein:

said closure member is a gate mounted in said valve body for planar movement, and said recess is carried on said gate.

4. The combination defined by claim 1 including:

yieldable means biasing said closure member into said limited axial movement.

5. The combination defined by claim 1 including:

complementary wedging surfaces around said sealing portions, said wedging surfaces being engageable when said closure member is moved toward open position to cam the annular protuberance out of said recess.

6. The combination defined by claim 1 wherein:

said closure member is a gate mounted in said valve body member for planar movement between open and closed positions, and including:

a biasing ring carried on one of said members, and yieldable means biasing said ring toward the other of said members to produce said limited axial movement.

7. The combination defined by claim 6 including:

complementary wedging surfaces on said biasing ring and said other members to cam said biasing ring in opposition to said yieldable means, and stop means on said one member to limit outward movement of said biasing ring when said closure member is in open position.

8. The combination defined by claim 6 wherein:

said fluid openings form upstream and downstream flow passages, and said resilient seal ring is mounted on the downstream side of the gate and said biasing ring is mounted on the upstream side thereof, and including:

complementary wedging surfaces around said sealing portions, said wedging surfaces being engageable when said closure member is moved toward open position to cam the annular protuberance out of said recess.

9. The combination defined by claim 1 wherein:

said closure member is a gate mounted in said valve body for planar movement between open and closed positions, and including:

a plurality of pusher buttons movably mounted on one of said members on one side of said gate progressively engaged by the other of said members as said gate covers said fluid openings, and biasing means urging each of said buttons toward said other member to produce said limited axial movement.

References Cited

UNITED STATES PATENTS 3,065,951  11/1962  Fennema _____ 251—172

HAROLD W. WEAKLEY, Primary Examiner

U.S. Cl. X.R.

251—175, 176, 193, 328